United States Patent
Chang et al.

(10) Patent No.: US 11,238,877 B2
(45) Date of Patent: Feb. 1, 2022

(54) GENERATIVE ADVERSARIAL NETWORK-BASED SPEECH BANDWIDTH EXTENDER AND EXTENSION METHOD

(71) Applicant: INDUSTRY-UNIVERSITY COOPERATION FOUNDATION HANYANG UNIVERSITY, Seoul (KR)

(72) Inventors: Joon-Hyuk Chang, Seoul (KR); Kyoungjin Noh, Seoul (KR)

(73) Assignee: IUCF-HYU (INDUSTRY-UNIVERSITY COOPERATION FOUNDATION HANYANG UNIVERSITY), Seoul (KR)

(*) Notice: Subject to any disclaimer, the term of this patent is extended or adjusted under 35 U.S.C. 154(b) by 57 days.

(21) Appl. No.: 16/618,672

(22) PCT Filed: May 17, 2018

(86) PCT No.: PCT/KR2018/005647
§ 371 (c)(1),
(2) Date: Dec. 2, 2019

(87) PCT Pub. No.: WO2019/004592
PCT Pub. Date: Jan. 3, 2019

(65) Prior Publication Data
US 2021/0166705 A1    Jun. 3, 2021

(30) Foreign Application Priority Data
Jun. 27, 2017 (KR) .................. 10-2017-0081024

(51) Int. Cl.
G10L 21/038    (2013.01)
G10L 25/30    (2013.01)
G10L 19/038    (2013.01)

(52) U.S. Cl.
CPC .......... G10L 19/038 (2013.01); G10L 21/038 (2013.01); G10L 25/30 (2013.01)

(58) Field of Classification Search
CPC .................... G10L 21/038; G10L 25/30
See application file for complete search history.

(56) References Cited

U.S. PATENT DOCUMENTS

| 10,581,469 B1* | 3/2020 | O'Shea | ............... H04B 1/0475 |
| 2006/0190254 A1* | 8/2006 | Iser | ...................... G10L 21/038 704/243 |

(Continued)

FOREIGN PATENT DOCUMENTS

| JP | 2003-526123 A | 9/2003 |
| JP | 2004-252477 A | 9/2004 |

(Continued)

OTHER PUBLICATIONS

Liu, B., Tao, J., Wen, Z., Li, Y., & Bukhari, D. (2015). A novel method of artificial bandwidth extension using deep architecture. In Sixteenth Annual Conference of the International Speech Communication Association.*

(Continued)

*Primary Examiner* — Bryan S Blankenagel
(74) *Attorney, Agent, or Firm* — Sughrue Mion, PLLC

(57) ABSTRACT

Proposed are a generative adversarial network-based speech bandwidth extender and extension method. A generative adversarial network-based speech bandwidth extension method, according to an embodiment, comprises the steps of: extracting feature vectors from a narrowband (NB) signal and a wideband (WB) signal of a speech; estimating the feature vector of the wideband signal from the feature vector of the narrowband signal; and learning a deep neural network classification model for discriminating the estimated feature vector of the wideband signal from the actually (Continued)

extracted feature vector of the wideband signal and the actually extracted feature vector of the narrowband signal.

12 Claims, 8 Drawing Sheets

(56) References Cited

U.S. PATENT DOCUMENTS

| | | | | |
|---|---|---|---|---|
| 2014/0257804 A1* | 9/2014 | Li | ............................ | G10L 15/16 704/232 |
| 2020/0143240 A1* | 5/2020 | Baker | ....................... | G06N 3/04 |

FOREIGN PATENT DOCUMENTS

| KR | 10-2007-0085982 A | 8/2007 |
|---|---|---|
| KR | 10-0762596 A | 10/2007 |

OTHER PUBLICATIONS

Zöhrer, M., & Pernkopf, F. (2016). Gated recurrent networks applied to acoustic scene classification and acoustic event detection. Detection and Classification of Acoustic Scenes and Events, 2016.*

Springenberg, J. T. (2015). Unsupervised and semi-supervised learning with categorical generative adversarial networks. arXiv preprint arXiv:1511.06390.*

Goodfellow, I. J., Pouget-Abadie, J., Mirza, M., Xu, B., Warde-Farley, D., Ozair, S., . . . & Bengio, Y. (2014). Generative adversarial networks. arXiv preprint arXiv: 1406.2661.*

Bruna, J., Sprechmann, P., & LeCun, Y. (2015). Super-resolution with deep convolutional sufficient statistics. arXiv preprint arXiv: 1511.05666.*

Kyoungjin Noh et al., "Ensemble of Deep Neural Networks for Artificial Noise Robust Speech Bandwidth Extension", Proceeding of the 2017 Korean Institute of Communications and Information Sciences Summer Conference, The Korean Institute of Communications and Information Sciences, Jun. 21-23, 2017, pp. 792-793.

Xiao-Lei Zhang et al., "Deep Belief Networks Based Voice Activity Detection", IEEE Transactions on Audio, Speech, and Language Processing, Apr. 2013, pp. 697-710, vol. 21, No. 4.

Kehuang Li et al., "A Deep Neural Network Approach To Speech Bandwidth Expansion", ICASSP 2015, pp. 4395-4399.

Yu Gu et al., "Speech Bandwidth Extension Using Bottleneck Features and Deep Recurrent Neural Networks", INTERSPEECH 2016, Sep. 8-12, 2016, pp. 297-301.

International Search Report for PCT/KR2018/005647, dated Aug. 29, 2018.

* cited by examiner

GENERATIVE ADVERSARIAL NETWORK-BASED SPEECH BANDWIDTH EXTENDER AND EXTENSION METHOD

TECHNICAL FIELD

Example embodiments of the following description relate to a speech bandwidth extender and extension method, and more particularly, to technology for improving speech call quality by extending a narrowband speech signal to a wideband speech signal.

RELATED ART

Existing speech bandwidth extender technology has attempted methods of estimating high frequency band information based on various machine learning schemes. In particular, methods using deep neural network (DNN) are frequently attempted. The DNN refers to technology capable of effectively modeling a nonlinear relationship between an input and an output using a plurality of hidden layers and a plurality of hidden nodes as a machine learning technique and currently exhibiting excellent performance in various fields in addition to a speech.

Methods using the DNN are generally classified into two approaches: one approach refers to a method of simply replacing an existing machine learning classification model with a DNN classification model and the other approach refers to a method of directly estimating a high frequency band component using a DNN generation model.

The method using the DNN classification model may achieve a relatively improved performance compared to the existing machine learning classification model, however, has a limitation in an estimation performance that is generally found in a method of classifying all of the speech features into a plurality of classes and then estimating a speech feature. The method using the DNN generation model may not properly estimate an actual value and has a limitation in that estimate values are smoothed. Due to such limitations, unpleasant noise occurs when an overestimation occurs in a high frequency band spectrum.

Korean Registration Patent No. 10-0762596 relates to a speech signal preprocessing system and a speech signal feature information extracting method and describes technology for preprocessing a speech signal using a neural network recognition method.

DETAILED DESCRIPTION

Subject

One or more example embodiments relate to a speech bandwidth extender and extension method, and more particularly, provide a speech bandwidth extender and extension method that may estimate a high frequency band of a speech signal using a generative adversarial network.

One or more example embodiments provide an improved speech bandwidth extension method by applying a generative adversarial network to a speech bandwidth extension method as a method of sufficiently training a classification model to discriminate true data, a wideband signal, from fake data that generates a high frequency band through a generation model and then fixing the classification model and training the generation model to estimate a high frequency band close to the actual wideband signal and to cause the classification model to maximally make a misidentification.

Solution

A generative adversarial network-based speech bandwidth extension method may include extracting feature vectors from a narrowband (NB) signal and a wideband (WB) signal of a speech; estimating the feature vector of the wideband signal from the feature vector of the narrowband signal; and training a deep neural network (DNN) classification model that discriminates the estimated feature vector of the wideband signal from the actually extracted feature vector of the wideband signal and feature vector of the narrowband signal.

The estimating of the feature vector of the wideband signal from the feature vector of the narrowband signal may include training a DNN generation model using the feature vector of the narrowband signal as an input and outputting the estimated feature vector of the wideband signal.

The generative adversarial network-based speech bandwidth extension method may further include retraining the DNN generation model such that the estimated feature vector of the wideband signal is misidentified as the actual feature vector of the wideband signal at the trained DNN classification model.

The retraining of the DNN generation model such that the estimated feature vector of the wideband signal is misidentified as the actual feature vector of the wideband signal at the trained DNN classification model may include training the DNN generation model by designing a cost function for the purpose of the DNN classification model misidentifying the estimated feature vector of the wideband signal as the actual feature vector of the wideband signal.

The training of the DNN classification model that discriminates the estimated feature vector of the wideband signal from the actually extracted feature vector of the wideband signal and feature vector of the narrowband signal may include training the DNN classification model by designing a cost function such that the DNN classification model discriminates the estimated feature vector of the wideband signal from the actually extracted feature vector of the wideband signal and feature vector of the narrowband signal.

The DNN generation model or the DNN classification model may be at least one of deep neural networks (DNN), convolutional neural networks (CNN), current neural networks (RNN), and long-short term memory (LSTM).

The DNN generation model may be the CNN in a structure in which a convolutional layer performing encoding functionality and a deconvolutional layer performing decoding functionality are symmetrically provided.

A speech bandwidth may be extended through a generative adversarial network that sufficiently trains the DNN classification model to discriminate the actual feature vector of the wideband signal from the estimated feature vector of the wideband signal generating a high frequency band through the DNN generation model and then, fixes the DNN classification model and trains the DNN generation model to estimate a high frequency band close to the actual feature vector of the wideband signal and to cause the DNN classification model to make a misidentification.

A generative adversarial network-based speech bandwidth extension apparatus according to another example embodiment may include a feature vector extractor configured to extract feature vectors from a narrowband (NB) signal and a wideband (WB) signal of a speech; a generation modeler configured to train a deep neural network (DNN) generation model using the feature vector of the narrowband signal as an input and to output an estimated feature vector of the wideband signal; and a classification modeler configured to train a DNN classification model that discriminates the estimated feature vector of the wideband signal from the actually extracted feature vector of the wideband signal and feature vector of the narrowband signal.

The generation modeler may be configured to retrain the DNN generation model such that the estimated feature vector of the wideband signal is misidentified as the actual feature for of the wideband signal at the trained DNN classification model.

The generation modeler may be configured to train the DNN generation model by designing a cost function for the purpose of the DNN classification model misidentifying the estimated feature vector of the wideband signal as the actual feature vector of the wideband signal.

The classification modeler may be configured to train the DNN classification model by designing a cost function such that the DNN classification model discriminates the estimated feature vector of the wideband signal from the actually extracted feature vector of the wideband signal and feature vector of the narrowband signal.

The DNN generation model or the DNN classification model may be at least one of DNN. CNN, RNN, and LSTM.

The DNN generation model may be the CNN in a structure in which a convolutional layer performing encoding functionality and a deconvolutional layer performing decoding functionality are symmetrically provided.

A speech bandwidth may be extended through a generative adversarial network that sufficiently trains the DNN classification model to discriminate the actual feature vector of the wideband signal from the estimated feature vector of the wideband signal generating a high frequency band through the DNN generation model and then, fixes the DNN classification model and trains the DNN generation model to estimate a high frequency band close to the actual feature vector of the wideband signal and to cause the DNN classification model to make a misidentification.

Effect

According to some example embodiments, there may be provided a generative adversarial network-based speech bandwidth extender and extension method that enables a speech with a wider bandwidth to be audible without a codec conversion or an extension of a transmission bitrate in a speech communication environment. In particular, by maximizing the estimation performance of a deep neural network (DNN)-based generation model using a generative adversarial network, it is possible to achieve the improved speech call quality without mixing an artificial sound that makes a person feel unpleasant to hear, which occurs due to a limitation found in a method using an existing DNN-based generation model. Further, through application to a speech recognizer, it is possible to provide a higher level of speech recognition rate at the same transmission speed as that of an existing method using a narrowband codec.

BEST MODE

Figure 1:
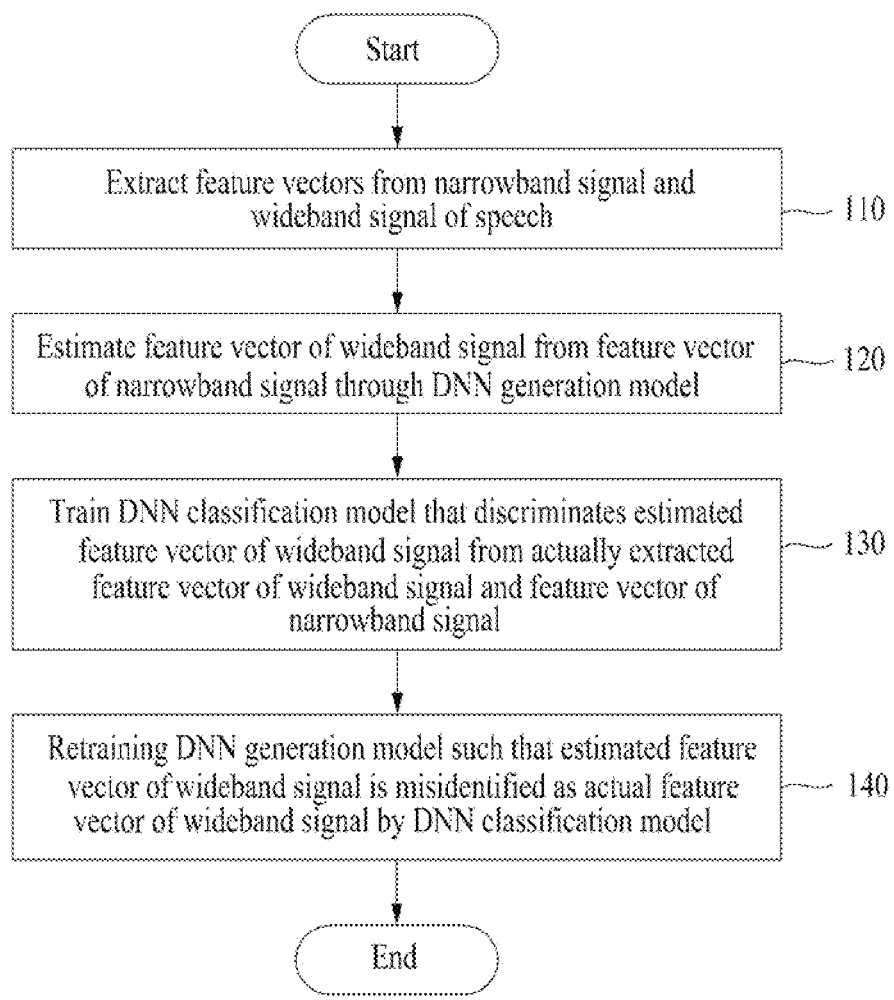
FIG. 1 is a flowchart illustrating a generative adversarial network-based speech bandwidth extension method according to an example embodiment.

Hereinafter, example embodiments will be described with reference to the accompanying drawings. However, various modifications may be made to the example embodiments and the scope of the present disclosure is not limited to or restricted by the following example embodiments. Also, the example embodiments are provided to further fully explain the present disclosure to those skilled in the art. Shapes and sizes, etc., of components in the drawings may be exaggerated for clarity of description.

The following example embodiments relate to a speech bandwidth extender and extension method, and more particularly, to a speech bandwidth extender and extension method that may estimate a high frequency band of a speech signal using a generative adversarial network.

To overcome limitations of a deep neural network (DNN)-based model, a generative adversarial network scheme has been introduced and the generative adversarial network scheme has exhibited the improved performance, particularly, in a DNN generation model. The generative adversarial network scheme relates to a method of maximizing the performance of a generation model by training a classification model and the generation model to compete with each other. Initially, the method may sufficiently train the classification model to discriminate true data from fake data generated through the generation model and then fix the classification model and may train the generation model to cause the classification model to maximally make a misidentification.

Although the example embodiments are described based on an example of using a fast Fourier transform (TFT) and a short time Fourier transform (STFT), they are provided as examples only. In addition to the FFT and the STFT, an inverse short time Fourier transform (ISTFT), a discrete Fourier transform (DFT), an inverse discrete Fourier transform (IDFT), an inverse fast Fourier transform (IFFT), etc., may be used.

FIG. 1 is a flowchart illustrating a generative adversarial network-based speech bandwidth extension method according to an example embodiment.

Referring to FIG. 1, the generative adversarial network-based speech bandwidth extension method may include operation 110 of extracting feature vectors from a narrowband (NB) signal and a wideband (WB) signal of a speech, operation 120 of estimating the feature vector of the wideband signal from the feature vector of the narrowband signal, and operation 130 of training a DNN classification model that discriminates the estimated feature vector of the wideband signal from the actually extracted feature vector of the wideband signal and feature vector of the narrowband signal.

Here, the generative adversarial network-based speech bandwidth extension method may further include operation 140 of retraining the DNN generation model such that the estimated feature vector of the wideband signal is misidentified as the actual feature vector of the wideband signal at the trained DNN classification model.

The conventional method using an existing DNN generation model may not properly estimate an actual value and has a limitation in that estimate values are smoothed. Due to such limitations, unpleasant noise occurs when overestimation occurs in a high frequency band spectrum.

To solve an issue of not properly estimating a distribution of actual values, a feature vector may be extracted from a first wideband signal (correct answer) and may be used to train the DNN classification model. Here, the feature vector may refer to a spectrum of a frequency axis or a plurality of feature vectors extracted from the spectrum, or a wideband signal itself of a time axis.

By initially sufficiently training a classification model using a wideband signal (training using correct answer) and then training a DNN generation model using a narrowband signal and the wideband signal, it is possible to generate the DNN generation model capable of generating an estimated wideband (incorrect answer) using the narrowband signal as an input. Once the DNN generation model is sufficiently trained, the DNN classification model previously trained using the narrowband signal and the wideband signal may be sufficiently trained (to learn an incorrect answer) using the narrowband signal and the estimated wideband signal this time.

In a state in which the DNN classification model sufficiently trained using the correct answer and the incorrect answer is fixed, it is possible to improve a feature vector estimation performance of the wideband signal using the feature vector of the narrowband signal as an input through the DNN generation model. Here, training to improve the feature vector estimation performance of the wideband signal may be performed to trick the DNN classification model into classifying the narrowband signal as the wideband signal (correct answer).

The feature vector estimation performance of the high frequency band based on the DNN generation model trained sufficient to trick the DNN classification model may exhibit the further improved estimation performance compared to the conventional DNN generation model.

As described above, the example embodiments may provide an improved speech bandwidth extension method by applying a generative adversarial network to a speech bandwidth extension method as a method of sufficiently training the classification model to discriminate true data, a wideband signal, from fake data that generates a high frequency band through the generation model and then, fixing the classification model and training the generation model to estimate a high frequency band close to the actual wideband signal and to cause the classification model to maximally make a misidentification.

Hereinafter, the generative adversarial network-based speech bandwidth extension method is further described using an example.

Figure 2:
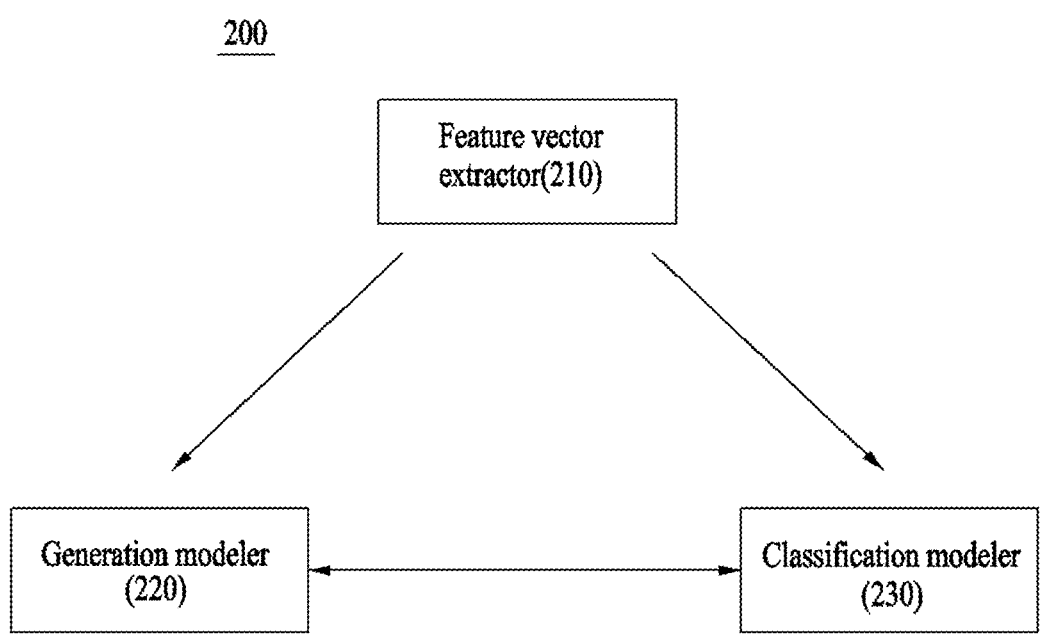
FIG. 2 is a block diagram illustrating a generative adversarial network-based speech bandwidth extension apparatus according to an example embodiment.

FIG. 2 is a block diagram illustrating an example of a generative adversarial network-based speech bandwidth extension apparatus according to an example embodiment.

The respective, operations 110 to 140 of FIG. 1 may be performed by a feature vector extractor 210, a generation modeler 220, and a classification modeler 230 that are components of FIG. 2.

Referring to FIG. 2, a generative adversarial network-based speech bandwidth extension apparatus 200 may include the feature vector extractor 210, the generation modeler 220, and the classification modeler 230.

In operation 110, the feature vector extractor 210 may extract feature vectors from a narrowband (NB) signal and a wideband (WB) signal of a speech.

Here, the narrowband signal may be generated by downsampling the wideband signal. To apply a performance degradation in an actual communication environment, the narrowband signal may be modified using a narrowband codec, for example, an adaptive multi-rate (AMR) or an adaptive multi-rate narrowband (AMR-NB).

In operation 120, the generation modeler 220 may estimate the feature vector of the wideband signal from the feature vector of the narrowband signal. The generation modeler 220 may train the DNN generation model using the feature vector of the narrowband signal as an input and may output the estimated feature vector of the wideband signal.

Here, the DNN generation model may be at least one of deep neural networks (DNN), convolutional neural networks (CNN), current neural networks (RNN), and long-short term memory (LSTM). For example, the DNN generation model may be the CNN in a structure in which a convolutional layer performing encoding functionality and a deconvolutional layer performing decoding functionality are symmetrically provided.

In operation 130, the classification modeler 230 may train the DNN classification model that discriminates the estimated feature vector of the wideband signal from the actually extracted feature vector of the wideband signal and feature vector of the narrowband signal.

Here, the DNN classification model may be at least one of DNN, CNN, RNN, and LSTM.

The classification modeler 230 may train the DNN classification model by designing a cost function such that the DNN classification model discriminates the estimated feature vector of the wideband signal from the actually extracted feature vector of the wideband signal and feature vector of the narrowband signal.

In operation 140, the generation modeler 220 may retrain the DNN generation model such that the estimated feature vector of the wideband signal is misidentified as the actual feature vector of the wideband signal at the trained DNN classification model.

Here, the generation modeler 220 may train the DNN generation model by designing a cost function for the purpose of the DNN classification model misidentifying the estimated feature vector of the wideband signal as the actual feature vector of the wideband signal.

According to example embodiments, it is possible to extend a speech bandwidth through a generative adversarial network that sufficiently trains the DNN classification model to discriminate the actual feature vector of the wideband signal from the estimated feature vector of the wideband signal generating a high frequency band through the DNN generation model and then, fixes the DNN classification model and trains the DNN generation model to estimate a high frequency band close to the actual feature vector of the wideband signal and to cause the DNN classification model to make a misidentification.

Hereinafter, a method of training a generative adversarial network proposed herein is described. Initially, the DNN generation model capable of estimating the wideband signal using the feature vector of the narrowband signal may be trained. Here, the feature vector may generally use a feature vector of a frequency axis, however, may also use a signal of a time axis. The DNN classification model capable of discriminating the actual wideband signal from the wideband signal estimated using the DNN generation model may be sufficiently trained. Once the DNN classification model is sufficiently trained to be capable of discriminating the actual wideband signal from the estimated wideband signal, the DNN generation model may be trained to trick the DNN classification model to misidentify the wideband signal estimated using the DNN generation model as the actual wideband signal.

Hereinafter, generative adversarial network-based speech bandwidth extension technology will be further described.

The feature vector extractor 210 may extract feature vectors from a narrowband signal and a wideband signal of a speech. The narrowband signal may be generated by down-sampling the wideband signal and may degrade the performance using a narrowband codec to apply a performance degradation by a codec in an actual communication environment. For example, the narrowband signal may be modified using the narrowband codec, for example, an AMR or an AMR-NB to apply the performance degradation in the actual communication environment.

The feature vector to be extracted from each of the narrowband signal and the wideband signal may be a speech signal itself of the time axis and may be a log power spectrum (LPS) of the frequency axis.

In the case of using the speech signal of the time, axis as the feature vector, a narrowband speech signal may be up-sampled to the wideband signal and then divided into frames each with a desired length and then used. For example, a frame with a length of a 1 second may be overlappingly divided based on a length of 0.5 seconds and extracted and then used as the feature vector.

In the case of using the LSP of the frequency axis as the feature vector, a frequency component value may be acquired using an STFT by up-sampling the narrowband speech signal to the wideband signal and dividing the same into frames each with a desired length.

In the case of applying a value of the frequency axis to a high frequency band extension method, a frequency component value may be separated into a magnitude and a phase and only a magnitude value may be used as the feature vector. Since a phase value does not significantly affect the sound quality of a speech signal, the phase value of the narrowband may be zero-symmetrically estimated and used as a phase value of the wideband according to general characteristics of the phase value. The magnitude value used as the feature vector may be squared and then finally used as the feature vector by taking a log. This is to convert a value to the range capable of excellently applying an audible characteristic of a human and to improve the estimation performance of the DNN generation model. In general, if the value range is too wide, the DNN generation model may not perform an efficient estimation.

Figure 3:
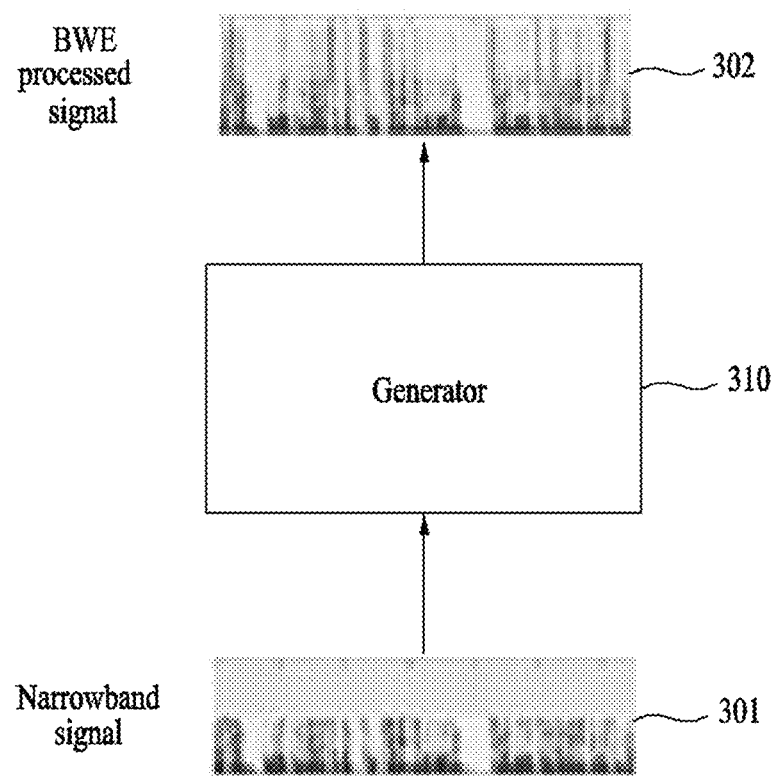
FIG. 3 illustrates an example of a method of training a deep neural network (DNN) generation model for a speech bandwidth extension according to an example embodiment.

FIG. 3 illustrates an example of a method of training a DNN generation model for a speech bandwidth extension according to an example embodiment.

Referring to FIG. 3, the generation modeler 220 may train a DNN generation model (generator) 310 configured to estimate a feature vector 302 of a wideband signal using a feature vector 301 of a narrowband signal as an input. That is, the generation modeler 220 may input the feature vector 301 of the narrowband signal to the DNN generation model 310 and may estimate the feature vector 302 of the wideband signal. Here, the estimated feature vector 302 of the wideband signal may be a speech bandwidth extension (BWE) processed signal.

Here, the DNN generation model 310 may be designed based on one of DNN, CNN, RNN, and LSTM.

A cost function of the DNN generation model 310 may be designed to decrease an average square of an actual value and an estimate value using a mean squared error (MSE).

Figure 4:
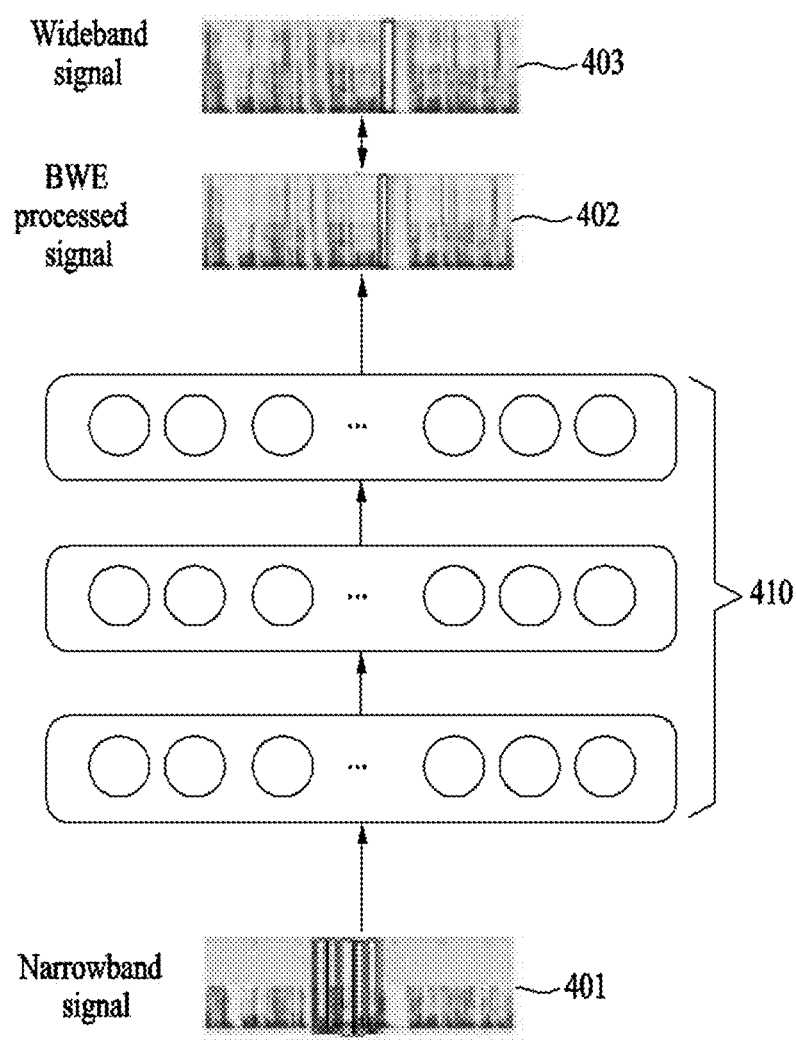
FIG. 4 illustrates an example of a structure of a DNN generation model for a speech bandwidth extension according to an example embodiment.

FIG. 4 illustrates an example of a structure of a DNN generation model for a speech bandwidth extension according to an example embodiment.

Referring to FIG. 4, a DNN generation model 410 configured to estimate a feature vector 402 of a wideband signal using a feature vector 401 of a narrowband signal as an input may be trained. Here, the DNN generation model 410 may be DNN.

The estimated feature vector 402 of the wideband signal may be a BLUE processed signal and a signal 403 represents an actual wideband signal.

Figure 5:
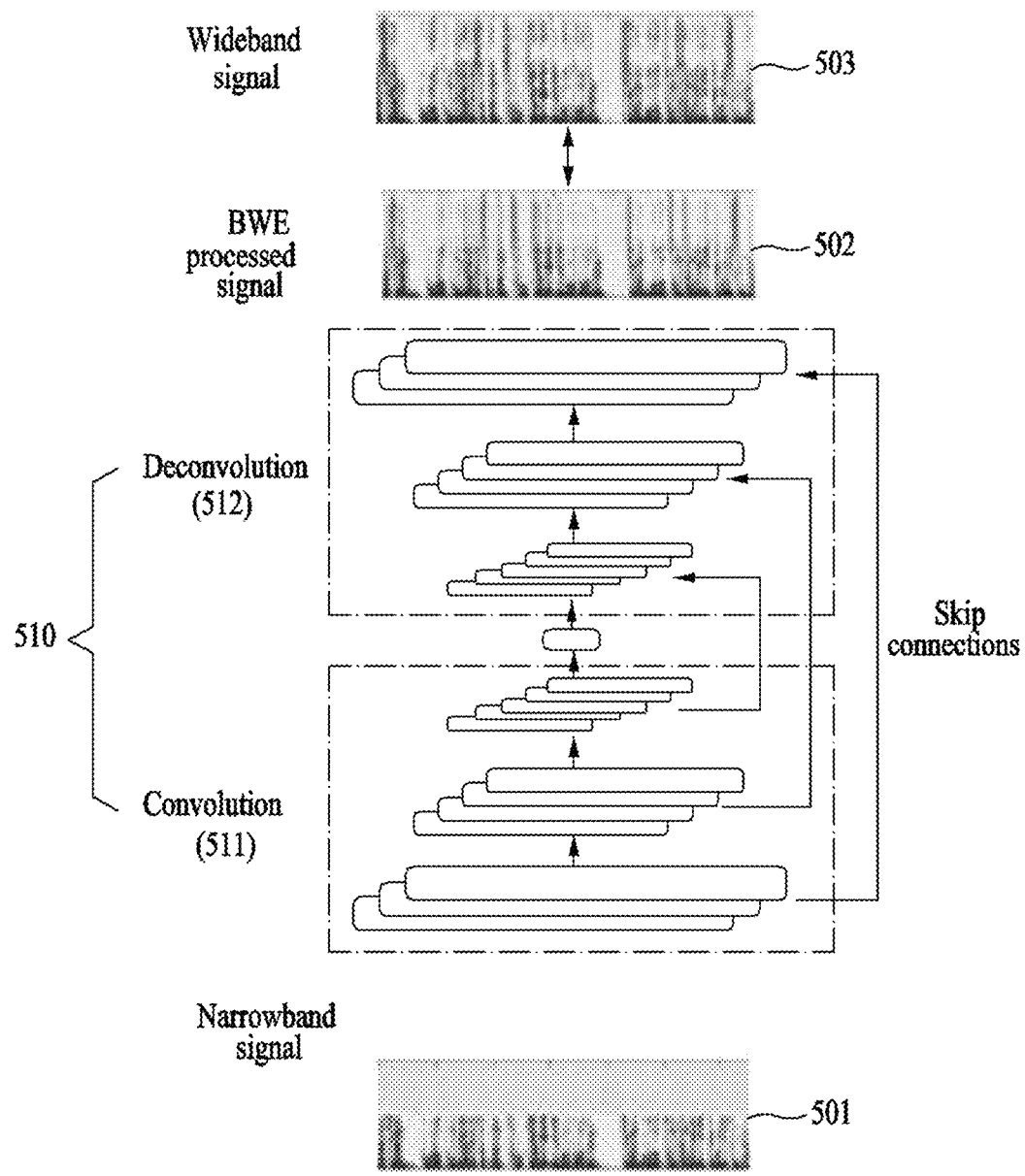
FIG. 5 illustrates an example of a structure of a DNN generation model (CNN) for a speech bandwidth extension according to another example embodiment.

FIG. 5 illustrates an example of a structure of a DNN generation model (CNN) for a speech bandwidth extension according to another example embodiment.

Referring to FIG. 5, a DNN generation model 510 configured to estimate a feature vector 502 of a wideband signal using a feature vector 501 of a narrowband signal as an input may be trained. Here, the DNN generation model 510 may be CNN.

When the DNN generation model 510 is designed as the CNN, a structure in which a convolutional layer 511 and a deconvolutional layer 512 are symmetrically provided may be used, which differs from a CNN classification model generally including a convolutional layer, a pooling layer, and a fully connected layer (FCL). Here, the convolutional layer 511 may perform encoding functionality and the deconvolutional layer 512 may perform decoding functionality.

Figure 6A:
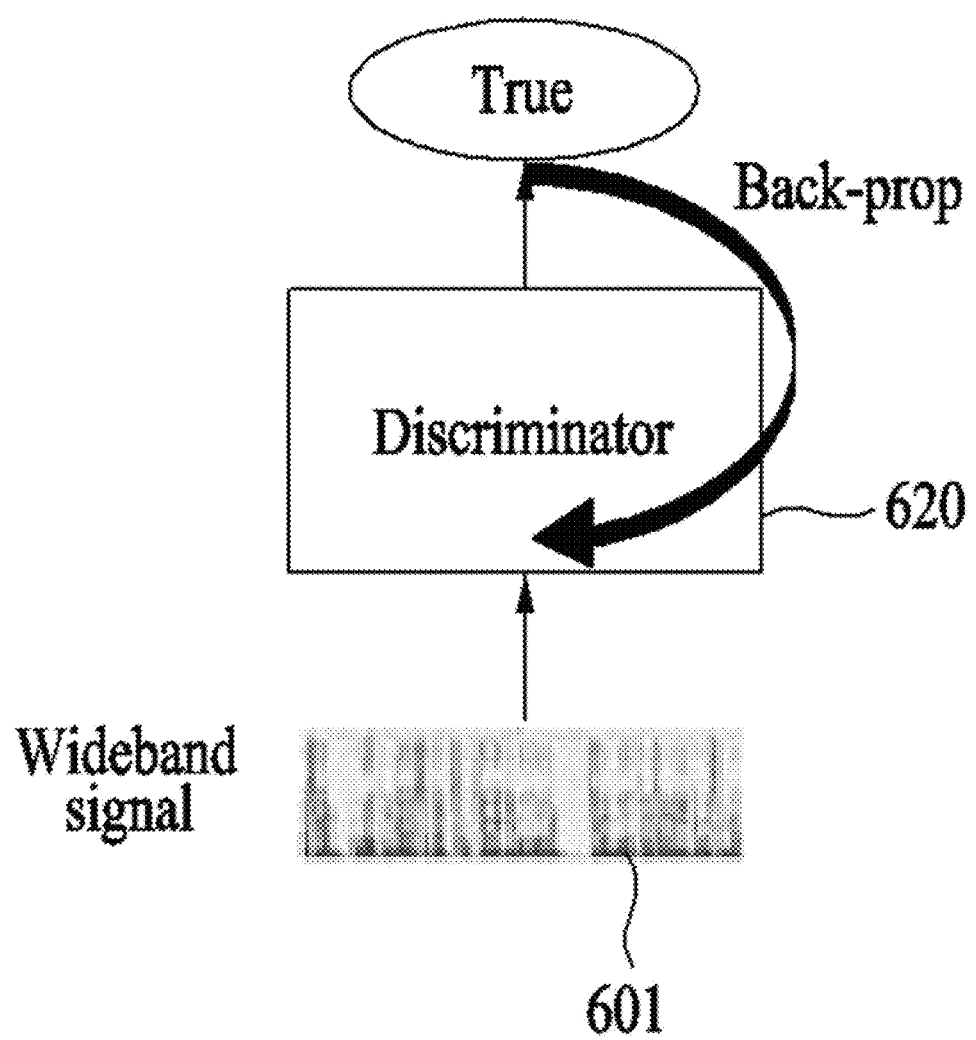
FIG. 6A illustrates an example of a method of training a DNN classification model for a generative adversarial network-based speech bandwidth extension using an actual feature vector according to an example embodiment.

FIG. 6A illustrates an example of a method of training a DNN classification model for a generative adversarial network-based speech bandwidth extension using an actual feature vector according to an example embodiment.

Referring to FIG. 6A, the classification modeler 230 may train a DNN classification model (discriminator) 620 capable of excellently discriminating an actual feature vector 601.

Figure 6B:
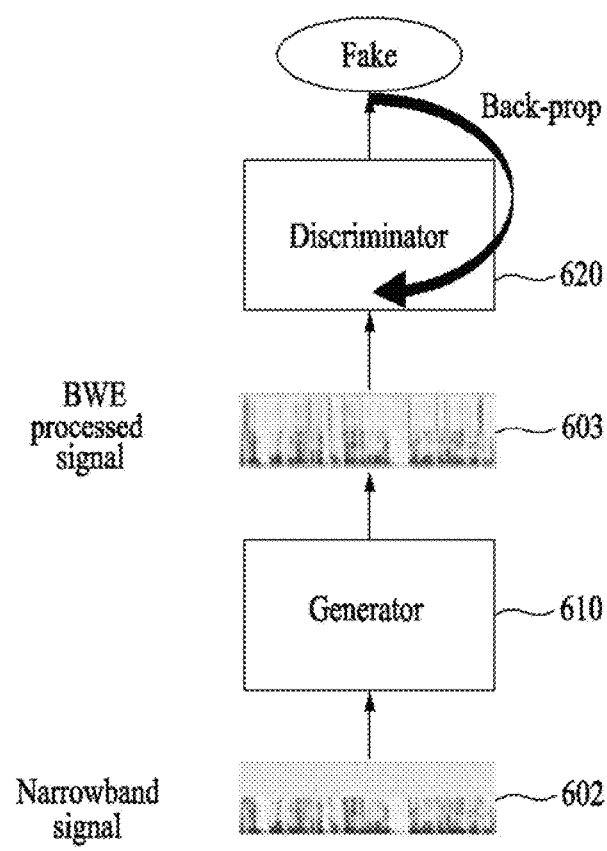
FIG. 6B illustrates an example of a method of training a DNN classification model for a generative adversarial network-based speech bandwidth extension using an estimated feature vector according to an example embodiment.

FIG. 6B illustrates an example of a method of training a DNN classification model for a generative adversarial network-based speech bandwidth extension using an estimated feature vector according to an example embodiment.

Referring to FIG. 6B, the classification modeler 230 may train a DNN classification model (discriminator) 620 capable of excellently discriminating an actual feature vector 601 of a wideband signal from a feature vector 603 of a wideband signal estimated using a DNN generation model (generator) 610. Here, the estimated feature vector 603 of the wideband signal may be a BWE processed signal from a feature vector 602 of a narrowband signal.

Here, the DNN generation model 610 or the DNN classification model 620 may be designed into any of DNN, CNN, RNN, and LSTM.

A cost function may be designed to determine a classification result D(x) of an actual wideband signal x as 1 and to determine a classification result D(G(z)) of an estimated wideband signal G(z) as 0 according to the following Equation 1.

$$\min_D V_{LSGAN}(D) = \frac{1}{2}\mathbb{E}_{x \sim P_{data}(x)}[(D(x)-1)^2] + \frac{1}{2}\mathbb{E}_{z \sim P_z(z)}[D(G(z))^2] \quad \text{[Equation 1]}$$

In Equation 1, z denotes a feature vector of a narrowband signal and x denotes a feature vector of an actual wideband signal. Also, D(x) denotes a result of a DNN classification model and G(z) denotes a result of a DNN generation model. Also, x~p(x) and z~p(z) denote sampling of data and E denotes an expectation value. Here, LSGAN represent least-square generative adversarial networks and may be a process of training the DNN classification model to minimize the cost function.

Figure 7:
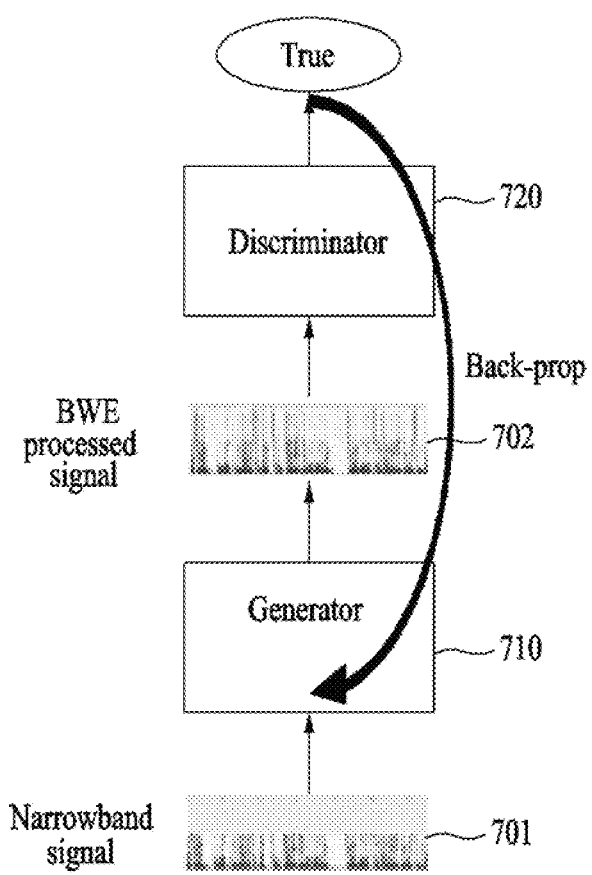
FIG. 7 illustrates an example of a method of retraining a DNN generation model for a generative adversarial network-based speech bandwidth extension according to an example embodiment.

FIG. 7 illustrates an example of a method of retraining a DNN generation model for a generative adversarial network-based speech bandwidth extension according to an example embodiment.

Referring to FIG. 7, the generation modeler 220 may additionally train a DNN generation model (generator) 710 such that an estimated feature vector 702 of a wideband signal is misidentified as an actual wideband signal at a trained DNN classification model (discriminator) 720. That is, the generation modeler 220 may retrain the DNN generation model 710 such that the estimated feature vector 702 of the wideband signal may be misidentified as the actual wideband signal at the trained DNN classification model 720.

Here, the generation modeler 220 may perform a training such that the DNN classification model 720 is fixed without update and only the DNN generation model 710 may trick the DNN classification model 720 (back-prop).

A cost function may be designed such that an analysis result of G(z), that is, D(G(z)) may have a value close to 1.

$$\min_G V_{LSGAN}(G) = \frac{1}{2}\mathbb{E}_{z \sim P_z(z)}[(D(G(z))-1)^2] \quad \text{[Equation 2]}$$

In Equation 2, z denotes a feature vector of a narrowband signal and x denotes a feature vector of an actual wideband signal. Also, D(x) denotes a result of a DNN classification model and G(z) denotes a result of a DNN generation model. Also, x~p(x) and z~p(z) denote sampling of data and E denotes an expectation value. Here, LSGAN represent least-square generative adversarial networks and may be a process of training a model to minimize a cost function by making a result of the DNN generation model be discriminated as the actual wideband signal at the DNN classification model.

Hereinafter, an evaluation method of a high frequency band extension method will be described.

A primary evaluation method of a high frequency band extension method may use a mean opinion score (MOS). This method listens to and evaluates a wideband signal that is an actual target signal, a wideband codec-based wideband speech signal, a narrowband codec-based narrowband speech signal, a reference high frequency band extension method, and the proposed high frequency band extension method. The MOS may be largely divided into an absolute category rating (ACR) and a degradation category rating (DCR). The ACR listens to a sound once and maps ratings between bad and excellent to numbers between 1 and 5. The DCR listens to a wideband sound signal (5 points) once and listens to a sound to be evaluated and maps ratings between bad and excellent to numbers between 1 and 5 compared to the wideband signal.

The following Table 1 shows an example of a subjective evaluation method (MOS) of the speech bandwidth extension method according to an example embodiment.

TABLE 1

|  | WB original | AMR-WR@ 12.651 kbps | AMR-NB@ 12.2 kbps | Ref-BWE | BWE-GAN |
|---|---|---|---|---|---|
| Clean | 4.96 | 3.94 | 2.35 | 3.15 | 3.36 |
| Babble (snr - 25 dB) | 4.88 | 3.87 | 2.30 | 2.89 | 3.11 |

Referring to Table 1, it can be verified that, as a result of MOS measure, technology (BWE-GAN) according to an example embodiment shows an increase of about 0.21 points in a quiet environment (Clean) and shows an increase of about 0.22 points in a noise environment (Babble) compared to the conventional high frequency band extension technology (Ref-BWE). That is, an increase in the overall data can be verified.

An auxiliary evaluation method of the high frequency band extension method may use a perceptual evaluation of speech quality (PESQ). This method is an objective evaluation method and refers to a method of inputting a speech signal to an algorithm and rating the speech signal to numbers. For example, the PESQ may input a speech signal to the algorithm and may rate the speech signal to numbers between −0.5 to 4.5. Scores obtained through the objective evaluation method may not be proportional to the sound quality for the high frequency band extension method and accordingly, may be used as the auxiliary evaluation method. In addition to the PESQ, a segmental sound to noise ratio (SNR), etc., may be used.

The following Table 2 shows an example of an objective evaluation method (PESQ) of the speech bandwidth extension method according to an example embodiment.

TABLE 2

|  | AMR-WR@ 12.651 kbps | AMR-NB@ 12.2 kbps | Ref-BWE | BWE-GAN |
|---|---|---|---|---|
| Clean | 3.95 | 2.68 | 2.98 | 3.22 |
| Babble (snr - 25 dB) | 3.72 | 2.63 | 2.94 | 3.07 |

Referring to Table 2, it can be verified that, as a result of PESQ measure, technology (BWE-GAN) according to an example embodiment shows an increase of about 0.24 points in a quiet environment (Clean) and shows an increase of about 0.13 points in a noise environment (Babble) compared to the conventional high frequency band extension technology (Ref-BWE). That is, an increase in the overall data can be verified.

According to some example embodiments, there may be provided a generative adversarial network-based speech bandwidth extender and extension method that enables a speech with a wider bandwidth to be audible without a codec conversion or an extension of a transmission bitrate in a speech communication environment. In particular, by maximizing the estimation performance of a DNN-based generation model using a generative adversarial network, it is possible to achieve the improved speech call quality without mixing an artificial sound that makes a person feel unpleasant to hear, which occurs clue to a limitation found in a method using an existing DNN-based generation model. Further, through application to a speech recognizer, it is possible to provide a higher level of speech recognition rate at the same transmission speed as that of an existing method using a narrowband codec.

Technology according to the example embodiments may apply to, for example, a wired/wireless speech communication terminal, an Internet network speech call service, a mobile Internet network speech call service, a speech recognition application, a smartphone Bluetooth communication system, a speech enhancement system, and a wireless communication system.

Also, through application to communication systems, for example, a wired/wireless telephone used for the existing narrowband communication network, a smartphone, a speech over Internet protocol (VoIP), and the like, it is possible to improve the speech call quality. Also, it is possible to improve a speech recognition rate through extension of a speech bandwidth at a server-based speech recognizer. Further, the proposed technology may apply to, for example, a narrowband communication network based wired/wireless telephone, a smartphone, a VoIP, a Bluetooth speech transceiving system, and a smartphone application using a speech recognizer.

The apparatuses described above may be implemented using hardware components, software components, and/or a combination thereof. For example, the apparatuses and the components described herein may be implemented using one or more general-purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or at least one combination thereof, for independently or collectively instructing or configuring the processing device to operate as desired. Software and/or data may be embodied permanently or temporarily in any type of machine, component, physical equipment, virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more computer readable storage mediums.

The methods according to the above-described example embodiments may be recorded in non-transitory computer-readable media including program instructions to implement various operations of the above-described example embodiments. The media may also include, alone or in combination with program instructions, data files, data structures, and the like. The program instructions stored in the media may be specially designed for those skilled in the art or may be known to those of computer software. Examples of the media include magnetic media such as hard disks, floppy disks, and magnetic tapes; optical media such as CD-ROM discs and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter.

While this disclosure includes specific example embodiments, it will be apparent to one of ordinary skill in the art that various alterations and modifications in form and details may be made in these example embodiments without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A method for generative adversarial network-based speech bandwidth extension, the method comprising:
    extracting feature vectors from a narrowband (NB) signal and a wideband (WB) signal of a speech;
    training a deep neural network (DNN) generation model that estimates a feature vector of the wideband signal using the extracted feature vector of the narrowband signal as an input;
    training a DNN classification model that discriminates the estimated feature vector of the wideband signal from the extracted feature vector of the wideband signal; and
    retraining the DNN generation model such that the estimated feature vector of the wideband signal is misidentified as the extracted feature vector of the wideband signal by the trained DNN classification model.

2. The method of claim 1, wherein the retraining of the DNN generation model comprises training the DNN generation model based on a cost function designed to cause the DNN classification model to misidentify the estimated feature vector of the wideband signal as the extracted feature vector of the wideband signal.

3. The method of claim 1, wherein the training of the DNN classification model comprises training the DNN classification model based on a cost function designed to discriminate the estimated feature vector of the wideband signal from the extracted feature vector of the wideband signal.

4. The method of claim 1, wherein the DNN generation model or the DNN classification model is at least one of deep neural networks (DNN), convolutional neural networks (CNN), recurrent neural networks (RNN), and long-short term memory (LSTM).

5. The method of claim 4, wherein the DNN generation model is the CNN in a structure in which a convolutional layer performing encoding functionality and a deconvolutional layer performing decoding functionality are symmetrically provided.

6. The method of claim 1, wherein the retraining of the DNN generation model is performed without updating the DNN classification model such that the DNN generation model estimates a high frequency band close to the extracted feature vector of the wideband signal which causes the DNN classification model to make a misidentification.

7. An apparatus for generative adversarial network-based speech bandwidth extension, the apparatus comprising:
- a feature vector extractor configured to extract feature vectors from a narrowband (NB) signal and a wideband (WB) signal of a speech;
- a generation modeler configured to train a deep neural network (DNN) generation model that estimates a feature vector of the wideband signal using the extracted feature vector of the narrowband signal as an input; and
- a classification modeler configured to train a DNN classification model that discriminates the estimated feature vector of the wideband signal from the extracted feature vector of the wideband signal,
- wherein the generation modeler is configured to retrain the DNN generation model such that the estimated feature vector of the wideband signal is misidentified as the extracted feature vector of the wideband signal by the trained DNN classification model.

8. The apparatus of claim 7, wherein the generation modeler is configured to train the DNN generation model based on a cost function designed to cause the DNN classification model to misidentify the estimated feature vector of the wideband signal as the extracted feature vector of the wideband signal.

9. The apparatus of claim 7, wherein the classification modeler is configured to train the DNN classification model based on a cost function designed to discriminate the estimated feature vector of the wideband signal from the extracted feature vector of the wideband signal.

10. The apparatus of claim 7, wherein the DNN generation model or the DNN classification model is at least one of deep neural networks (DNN), convolutional neural networks (CNN), recurrent neural network (RNN), and long-short term memory (LSTM).

11. The apparatus of claim 10, wherein the DNN generation model is the CNN in a structure in which a convolutional layer performing encoding functionality and a deconvolutional layer performing decoding functionality are symmetrically provided.

12. The apparatus of claim 7, wherein the generation modeler retrains the DNN generation model without updating the DNN classification model such that the DNN generation model estimates a high frequency band close to the extracted feature vector of the wideband signal which causes the DNN classification model to make a misidentification.

* * * * *